United States Patent
Carson et al.

(10) Patent No.: US 10,606,714 B2
(45) Date of Patent: Mar. 31, 2020

(54) STOPPING CENTRAL PROCESSING UNITS FOR DATA COLLECTION BASED ON EVENT CATEGORIES OF EVENTS

(71) Applicant: International Business Machines Corporation, Armonk, NY (US)

(72) Inventors: Matthew D. Carson, Encino, CA (US); Trung N. Nguyen, Vail, AZ (US); Louis A. Rasor, Tucson, AZ (US); Todd C. Sorenson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 15/695,490

(22) Filed: Sep. 5, 2017

(65) Prior Publication Data
US 2019/0073280 A1 Mar. 7, 2019

(51) Int. Cl.
| | | |
|---|---|---|
| *G06F 9/46* | (2006.01) | |
| *G06F 11/20* | (2006.01) | |
| *G06F 9/48* | (2006.01) | |
| *H04L 12/24* | (2006.01) | |
| *H04L 12/26* | (2006.01) | |
| *G06F 11/34* | (2006.01) | |
| *G06F 11/07* | (2006.01) | |

(52) U.S. Cl.
CPC ........ *G06F 11/2007* (2013.01); *G06F 9/4881* (2013.01); *G06F 11/0778* (2013.01); *G06F 11/3476* (2013.01); *H04L 41/065* (2013.01); *H04L 41/069* (2013.01); *H04L 41/0672* (2013.01); *H04L 43/0817* (2013.01); *G06F 2201/86* (2013.01)

(58) Field of Classification Search
None
See application file for complete search history.

(56) References Cited

U.S. PATENT DOCUMENTS

| | | | |
|---|---|---|---|
| 4,663,709 A | 5/1987 | Fujiwara et al. | |
| 5,640,508 A * | 6/1997 | Fujiwara ............ | G06F 11/1633 714/30 |
| 5,978,830 A | 11/1999 | Nakaya et al. | |
| 6,002,851 A | 12/1999 | Basavaiah et al. | |
| 6,823,516 B1 | 11/2004 | Cooper | |
| 8,151,098 B2 | 4/2012 | Niwa et al. | |
| 8,516,487 B2 | 8/2013 | Felton et al. | |
| 9,256,500 B2 | 2/2016 | Schulz et al. | |

(Continued)

FOREIGN PATENT DOCUMENTS

WO 2012036954 3/2012

OTHER PUBLICATIONS

List of IBM Patents or Patent Applications Treated as Related, dated Sep. 7, 2017, Total 2 pp.

(Continued)

*Primary Examiner* — Gregory A Kessler
(74) *Attorney, Agent, or Firm* — Rabindranath Dutta; Konrad, Raynes, Davda and Victor LLP

(57) ABSTRACT

A plurality of tasks are executed on a plurality of central processing units (CPUs) of a computational device. In response to an occurrence of an event in the computational device, one or more CPUs that are executing tasks associated with an event category to which the event belongs are stopped within a first predetermined amount of time. In response to stopping the one or more CPUs, a data set indicative of a state of the computational device is collected, for at most a second predetermined amount of time.

15 Claims, 9 Drawing Sheets

(56) References Cited

U.S. PATENT DOCUMENTS

| | | | |
|---|---|---|---|
| 9,459,974 | B2 | 10/2016 | He et al. |
| 2008/0189685 | A1 | 8/2008 | Aoki et al. |
| 2009/0089336 | A1* | 4/2009 | Dewey ................ G06F 11/0727 |
| 2010/0262971 | A1 | 10/2010 | Yamada |
| 2011/0078702 | A1* | 3/2011 | Hosoki .................. G06F 9/461 |
| | | | 718/108 |
| 2011/0197196 | A1 | 8/2011 | Felton et al. |
| 2017/0235627 | A1 | 8/2017 | Rasor et al. |

OTHER PUBLICATIONS

Lee et al., "Transparent CPU-GPU Collaboration for Data-Parallel Kernels on Heterogeneous Systems", dated 2015-2016, Advanced Computer Architecture Laboratory, Total 11 pages.

IBM "Efficient Monitoring of Plan Execution CPU Costs in a Database Server" dated Sep. 25, 2009, An IP.com Prior Art Database Technical Disclosure, Total 10 pages.

IBM, "Determination of Discrete Resources Shortages and Stopping the Culprit Task", dated Oct. 27, 2009, An IP.com Prior Art Database Technical Disclosure, Total 6 pages.

US Patent Application, dated Sep. 6, 2017, for U.S. Appl. No. 15/697,019, filed Sep. 6, 2017, invented by Trung N. Nguyen et al., Total 37 pages.

Office Action, dated Apr. 4, 2019, for U.S. Appl. No. 15/697,019, filed Sep. 6, 2017, invented by Trung N. Nguyen et al., Total 21 pages.

Response to Office Action, dated Jul. 5, 2019, for U.S. Appl. No. 15/697,019, filed Sep. 6, 2017, invented by Trung N. Nguyen et al., Total 11 pages.

Final Office Action, dated Oct. 18, 2019, for U.S. Appl. No. 15/697,019, filed Sep. 6, 2017, invented by Trung N. Nguyen, Total 16 pages.

Response to Final Office Action, dated Jan. 21, 2020, for U.S. Appl. No. 15/697,019, filed Sep. 6, 2017, invented by Trung N. Nguyen, Total 11 pages.

* cited by examiner

STOPPING CENTRAL PROCESSING UNITS FOR DATA COLLECTION BASED ON EVENT CATEGORIES OF EVENTS

BACKGROUND

1. Field

Embodiments relate to the stopping of central processing units for data collection based on event categories of events.

2. Background

In certain computing environments, a computational device such as a storage controller may control access to storage for one or more host computational devices that may be coupled to the storage controller over a network. A storage management application that executes in the storage controller may manage a plurality of storage devices, such as disk drives, tape drives, flash drives, direct access storage devices (DASD), etc., that are coupled to the storage system. A host computational device may send Input/Output (I/O) commands to the storage controller and the storage controller may execute the I/O commands to read data from the storage devices or write data to the storage devices.

The storage controller may include two or more servers, where each server may be referred to as a node, a storage server, a processor complex, a Central Processor Complex (CPC), or a Central Electronics Complex (CEC). Each server may be included in a cluster. Each server may have a plurality of central processing units and the servers may share the workload of the storage controller. In certain computing environments, in which the storage controller includes two servers, either server can failover to the other if there is a failure or a planned downtime for one of the two servers.

In many situations, an application that executes in a computational device (such as the storage controller), may generate an error condition during execution. In order to diagnose the reasons for the error condition, the state of the computational device at the time of the error condition may be recorded. The state of the computational device may be found in the recorded state of some or all of the working memory of the computational device and other elements of the computational device. The state of the computational device may also include information on program state, including processor registers, which may include the program counter and stack pointer, memory management information, and processor and operating system flags. The state of the computational device may be used to assist in diagnosing and debugging errors in applications. The state of the computational device may also be recorded in response to conditions other than error conditions.

SUMMARY OF THE PREFERRED EMBODIMENTS

Provided are a method, a system, a computer program product in which a plurality of tasks are executed on a plurality of central processing units (CPUs) of a computational device. In response to an occurrence of an event in the computational device, one or more CPUs that are executing tasks associated with an event category to which the event belongs are stopped within a first predetermined amount of time. In response to stopping the one or more CPUs, a data set indicative of a state of the computational device is collected, for at most a second predetermined amount of time.

In further embodiments, in response to completion of the collecting of the data set, operations are resumed in the one or more CPUs.

In further embodiments, properties associated with the event category include: a category identifier for the event category, wherein the category identifier identifies the event category; a list of tasks, wherein the list of tasks indicates the tasks to stop for the event category, in response to the occurrence on an event belonging to the event category; a stop time that indicates an amount of time within which CPUs executing tasks in the list of tasks are to be stopped; a data set collection time that indicates an amount of time within which a data set indicative of a state of the computational device is to be collected after stopping the CPUs executing the tasks in the list of tasks; and a data set collection mechanism comprising a function that when executed causes the data set to be collected.

In additional embodiments, each event of a plurality of events are associated with a category identifier that indicates the event category to which the event belongs.

In certain embodiments, the tasks associated with the event category have to be completed within a third predetermined amount of time, wherein the first predetermined amount of time and the second predetermined amount of time are set such the tasks associated with the event category are completed within the third predetermined amount of time.

In further embodiments, the one or more CPUs that are stopped are fewer in number than the plurality of CPUs. One or more other CPUs of the plurality of CPUs that are not executing tasks associated with an event category continue performing operations while the one or more CPUs are stopped. Different data sets are collected for different types of tasks with different time requirements.

In certain embodiments, selected tasks of the plurality of tasks are indicated as not participating in collection of data sets at a time of creation of the selected tasks, wherein if a CPU is executing any of the selected tasks, then the CPU is not stopped.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A computational device, such as a storage controller, may include a plurality of CPUs, wherein the plurality of CPUs may perform a plurality of tasks in parallel. There is a need for collecting certain types of state information in the storage controller, in response to the occurrence of certain events, such as error conditions or some other conditions triggered within the storage controller.

A mechanism to collect the state information is to stop all CPUs that are running. The CPUs may be stopped for a short amount of time, to collect the state information, and then the CPUs resume operations. In such mechanisms, all CPUs are stopped for the same amount of time to collect the same state information. However, depending on the event, there may be specific data sets reflecting a subset of the state information that may need to be collected. Additionally there may be a time limit on how long the CPUs that are running tasks related to the event can be stopped.

For example, if an event is triggered during a host read operation, then instead of stopping all CPUs, it may be desirable to stop only those CPUs that are running tasks for caching operations, host bus adapters, and commands, and collect a limited amount of state information. The amount of time allocated for stopping the CPUs and for collecting the limited amount of state information should be such that if there are performance requirements on the performing of the host read operations (e.g., host read operations should complete in 75 milliseconds), then such performance requirements are met.

In certain embodiments, a data capture application that executes in the storage controller stops CPUs that are running specific tasks, and collects specific data sets representing a specific amount of state information within a certain amount of time, based the type of event that triggers the collection of the specific data sets. In certain embodiments, different categories of events are maintained, where each category has certain timing requirements for data set collection and indicates the data set to collect, and the tasks to stop in response to an occurrence of an event that belongs to the category. When an event occurs, CPUs that are running certain tasks are stopped for data collection based on a set of time periods specified for the event category to which the event belongs. As a result, the performance requirements for tasks are met in a storage controller while at the same time state information related to an event is collected.

Exemplary Embodiments

Figure 1:
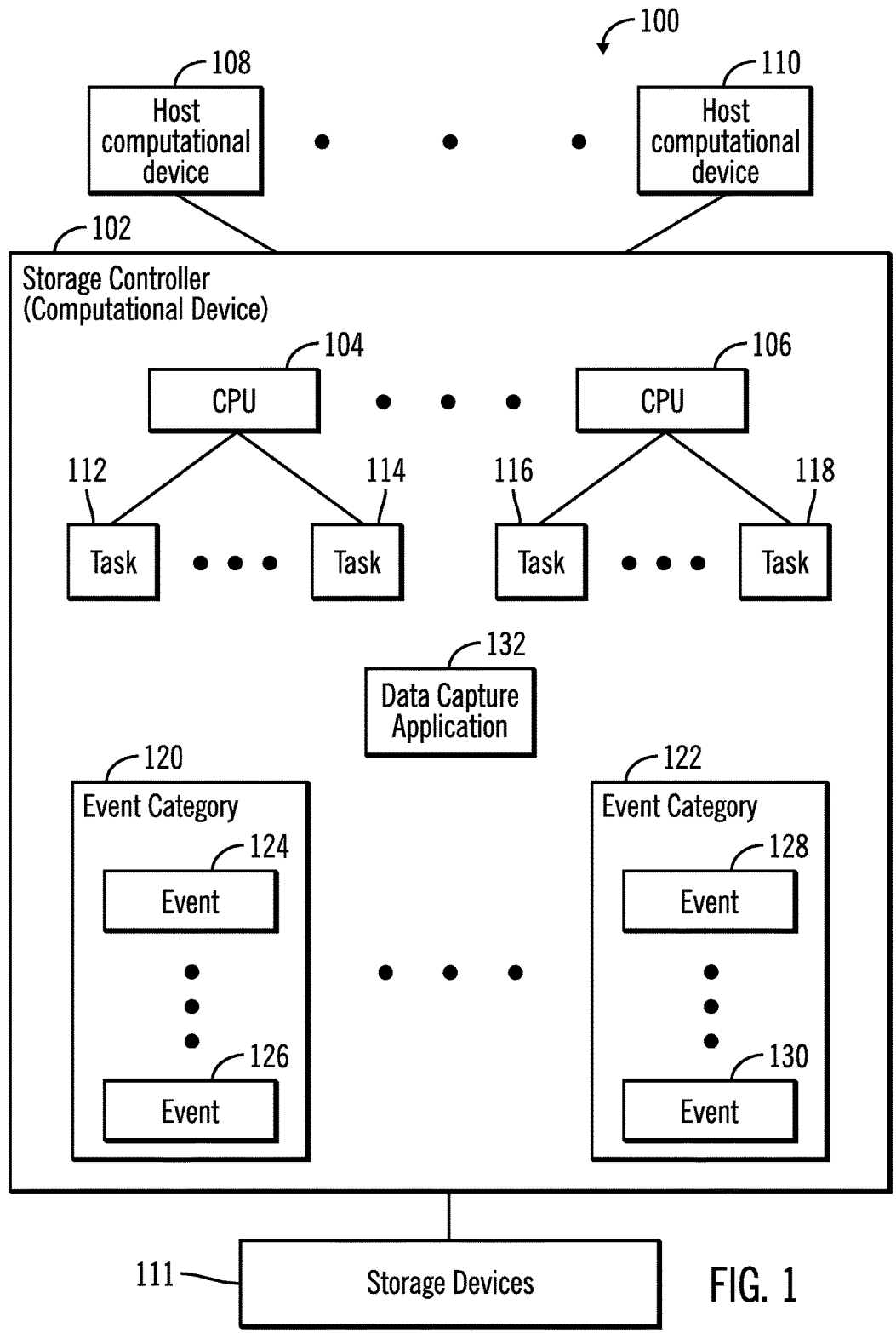
FIG. 1 illustrates a block diagram of a computing environment comprising a storage controller with a plurality of central processing units communicatively coupled to a plurality of host computational devices and a plurality of storage devices, in accordance with certain embodiments.

FIG. 1 illustrates a block diagram of a computing environment 100 comprising a storage controller 102 with a plurality of central processing units (CPUs) 104, 106 communicatively coupled to a plurality of host computational devices 108, 110 and a plurality of storage devices 111, in accordance with certain embodiments;

The storage controller 102 and the host computational devices 108, 110 may comprise any suitable computational device including those presently known in the art, such as, a personal computer, a workstation, a server, a mainframe, a hand held computer, a palm top computer, a telephony device, a network appliance, a blade computer, a processing device, a controller, etc. The storage controller 102 may be comprised of a plurality of servers (not shown) that may provide redundancy because if one server undergoes a failure from which recovery is not possible, an alternate server may perform the functions of the server that failed. Each of the plurality of servers may be referred to as a processing complex or a central electronics complex (CEC) and may include one or more processors and/or processor cores, such as the CPUs 104, 106. The storage controller 102 may also be referred to as a dual-server storage system.

The storage controller 102 and the host computational devices 108, 110 may be elements in any suitable network, such as, a storage area network, a wide area network, the Internet, an intranet. In certain embodiments, the storage controller 102 and the host computational devices 108, 110 may be elements in a cloud computing environment. While only two CPUs are identified by reference numerals 104, 106 in FIG. 1, it is understood that there may be more than two CPUs in the storage controller 102.

In certain embodiments, a plurality of tasks may be executed in the plurality of CPUs 104, 106. For example, CPU 104 may execute a plurality of tasks 112, 114, and CPU 106 may execute a plurality of tasks 116, 118.

In certain embodiments, a task, such as task 112 may have response time requirements below a certain threshold (such as 30 milliseconds). For example, if the task 112 is for an I/O operation from the host computational device 108, then the I/O operation is responded to in a timely manner by the storage controller 102 from data stored in the storage devices 111 within the threshold amount of time.

A plurality of events may occur in the storage controller 102, where the plurality of events are placed in a plurality of event categories in the storage controller 102. For example, FIG. 1 shows a plurality of event categories 120, 122 where event category 120 includes the plurality of events 124, 126, and event category 122 includes the plurality of events 128, 130. An event is an action or occurrence of a condition recognized by the storage controller 102. For example, an event may be triggered in response to an error condition or some other condition generated during the execution of an application in the storage controller 102.

In certain embodiments, a data capture application 132 implemented in software, firmware, hardware or any combination thereof executes in the storage controller 102. In response to an occurrence of an event in the storage controller 102, the data capture application 132 determines the event category of the event, and based on information included with each event category, stops a subset of the CPUs within a first predetermined amount of time (e.g., 5 milliseconds), and then collects data sets reflecting state information for a second predetermined amount of time (e.g., 70 milliseconds). By limiting the amount of time allocated for stopping selected CPUs and for collecting data sets, the timing constraints imposed on tasks are satisfied while at the same time the collection of data sets is performed.

Figure 2:
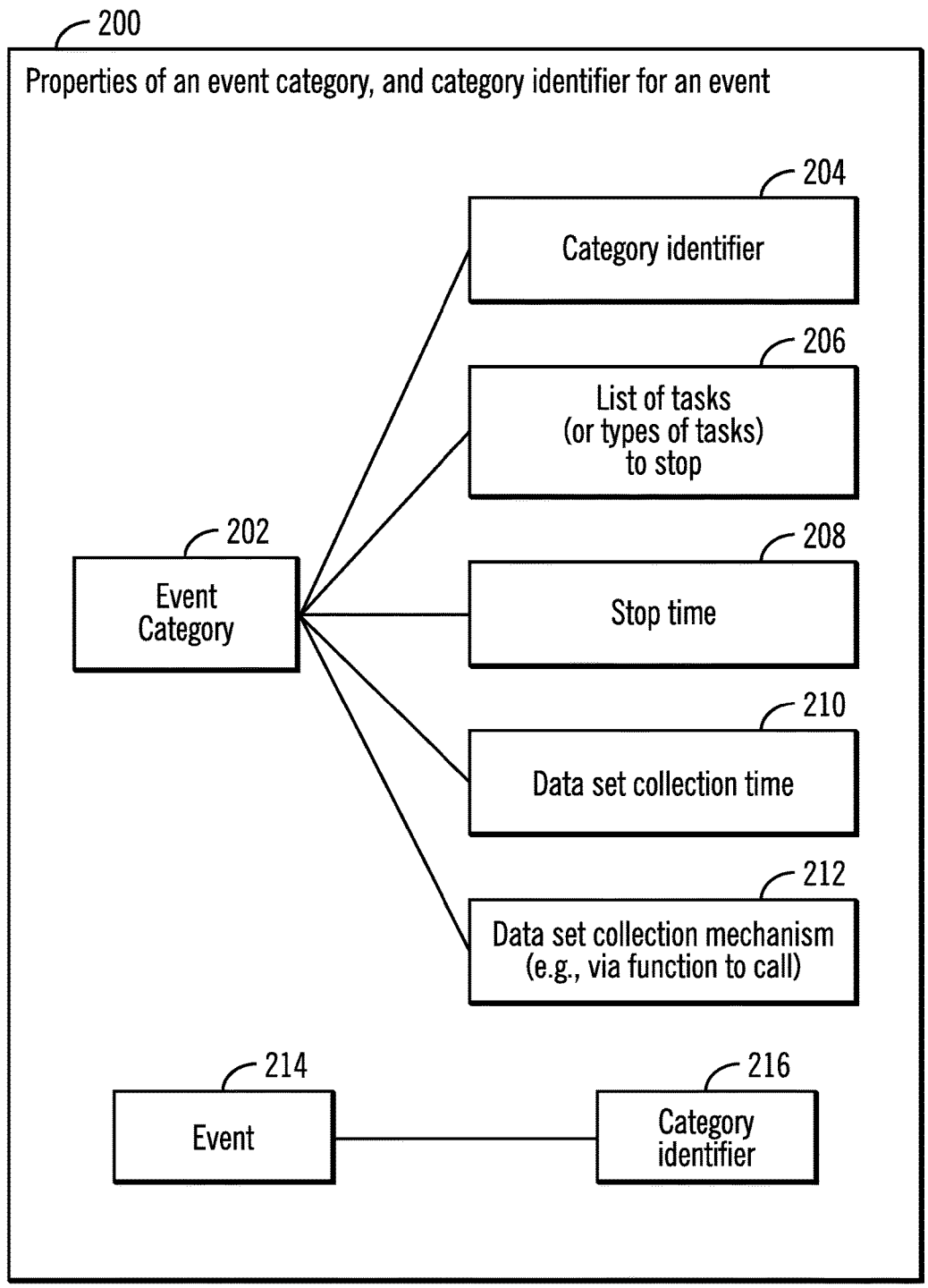
FIG. 2 illustrates a block diagram that shows properties of an event category and a category identifier for an event, in accordance with certain embodiments.

FIG. 2 illustrates a block diagram 200 that shows properties of an event category and a category identifier for an event, in accordance with certain embodiments.

An event category includes a plurality of events, and an exemplary event category 202 may have properties that include:

(A) A category identifier (reference numeral 204) for the event category, where the category identifier identifies the event category;

(B) A list of tasks (reference numeral 206), where the list of tasks indicates the tasks to stop for the event category, in response to the occurrence on an event belonging to the event category;

(C) A stop time (reference numeral 208) that indicates an amount of time within which CPUs executing tasks in the list of tasks are to be stopped;

(D) A data set collection time (reference numeral 210) that indicates an amount of time within which a data set indicative of a state of the computational device is to be collected (i.e., determined) after stopping the CPUs executing the tasks in the list of tasks; and (E) A data set collection mechanism (reference numeral 212) comprising a function that when executed causes the data set to be collected.

Each event, such as event 214 may have a category identifier 216 associated with the event, where the category identifier 216 identifies the event category to which the event belongs. For example, if the category identifier 216 associated with event 214 is the same as the category identifier 204 shown in the properties of event category 202, then event 214 belongs to the event category 202.

Figure 3:
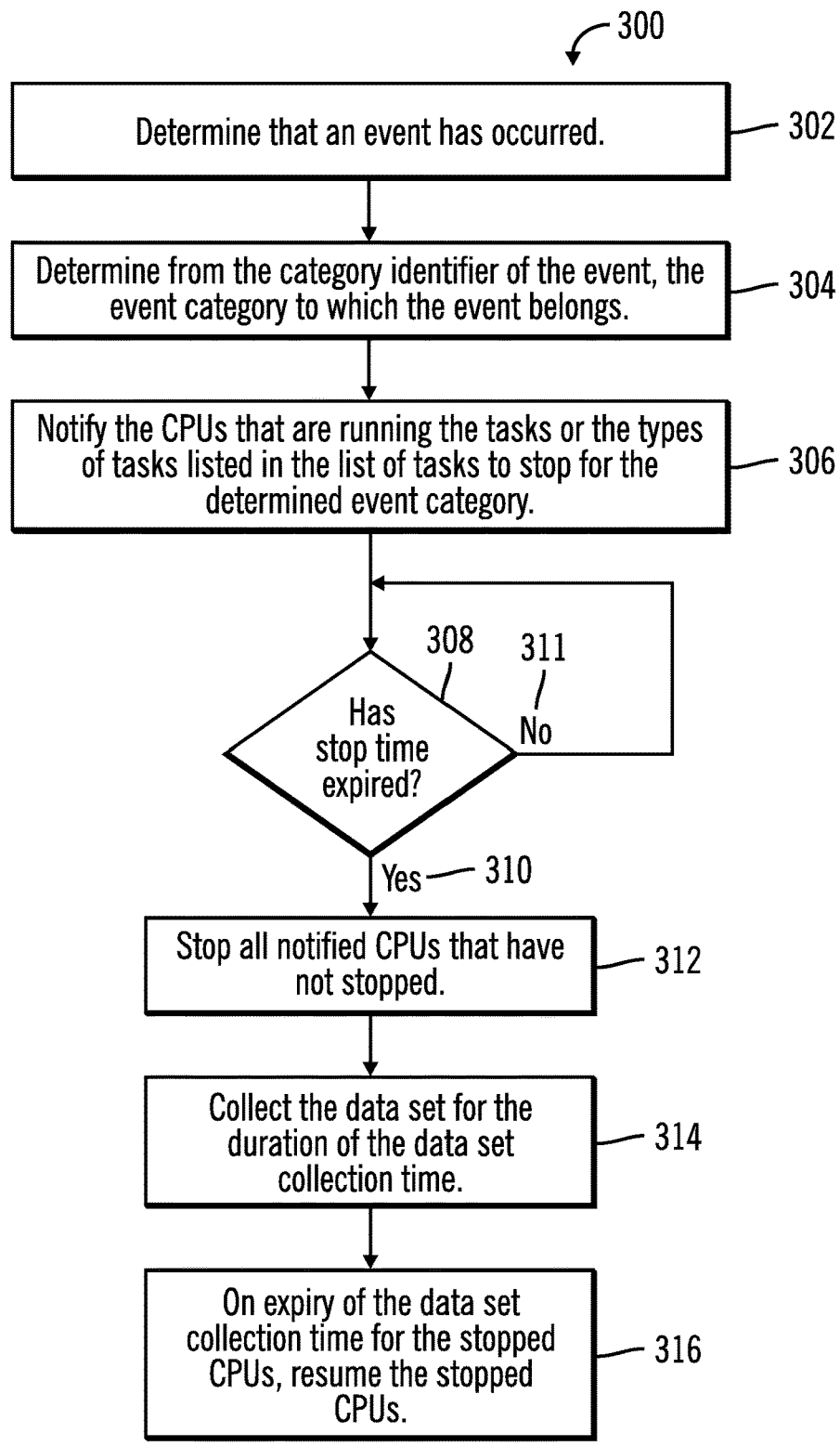
FIG. 3 illustrates a first flowchart that shows how a plurality of CPUs are stopped for collection of a data set, in response to an occurrence of an event, in accordance with certain embodiments.

FIG. 3 illustrates a first flowchart 300 that shows how a plurality of CPUs are stopped for data set collection, in response to an occurrence of an event, in accordance with certain embodiments. The operations shown in FIG. 3 may be performed by the data capture application 132 that executes in the storage controller 102.

Control starts at block 302 in which the data capture application 132 determines that an event 214 has occurred. The data capture application 132 determines (at block 304) from the category identifier of the event, the event category to which the event belongs. For example, in response to the occurrence of event 214, the data capture application 132 may determine from the category identifier 216 of the event 214 that event 214 belongs to the event category 202, if the category identifier 204 in the properties of the event category 202 is the same as the category identifier 216 of the event 214.

From block 304 control proceeds to block 306 in which the data capture application 132 notifies the CPUs that are running the tasks or the types of tasks listed in the list of tasks 206 to stop for the determined event category 202.

From block 306 control proceeds to block 308 in which the data capture application 132 determines whether the stop time 208 has expired. If so ("Yes" branch 310) control proceeds to block 312 in which the data capture application 132 stops all notified CPUs that have not stopped. Otherwise ("No" branch 311) the data capture application 132 again determines (at block 308) whether the stop time 208 has expired.

Therefore, at the conclusion of block 312, all CPUs that are running the tasks or the types of tasks listed in the list of tasks for the determined event category either voluntarily stop within the stop time 208 on being notified, or are forced to stop within the stop time 208. The stop time 208 acts as upper limit on the amount of time CPUs that are running the tasks or the types of tasks listed in the list of tasks for the determined event category are allowed to run after the occurrence of an event that belongs to the determined event category.

From block 312 control proceeds to block 314 in which the data capture application 132 in cooperation with the stopped CPUs performs operations to generate the data set indicative of the state of the storage controller 102 at the time of the event, for the duration of the data set collection time 210. For example, if the data set collection time 210 is set to be 70 milliseconds, then the data set is collected for no more than 70 milliseconds. To generate the data set the data capture application 132 may call a function specified in property indicated as the data set collection mechanism 212 for the event category 202. On expiry of the data set collection time, the stopped CPUs are resumed (at block 316). Therefore, CPUs are stopped for no more than the data set collection time 210.

As a result, the CPUs are allowed no more than the stop time 208 to stop, and the CPUs are stopped for no more than the data set collection time 210 for collection of the data set, in response to the occurrence of the event. By limiting the duration of the stop time 208 and the data set collection time 210, the timing requirements on tasks that run on the CPUs are satisfied. For example, if a task is required to complete in 300 milliseconds, the stop time may be set to 40 milliseconds and the data set collection time may be set to 60 milliseconds so that the likelihood of task completion is high.

Figure 4:
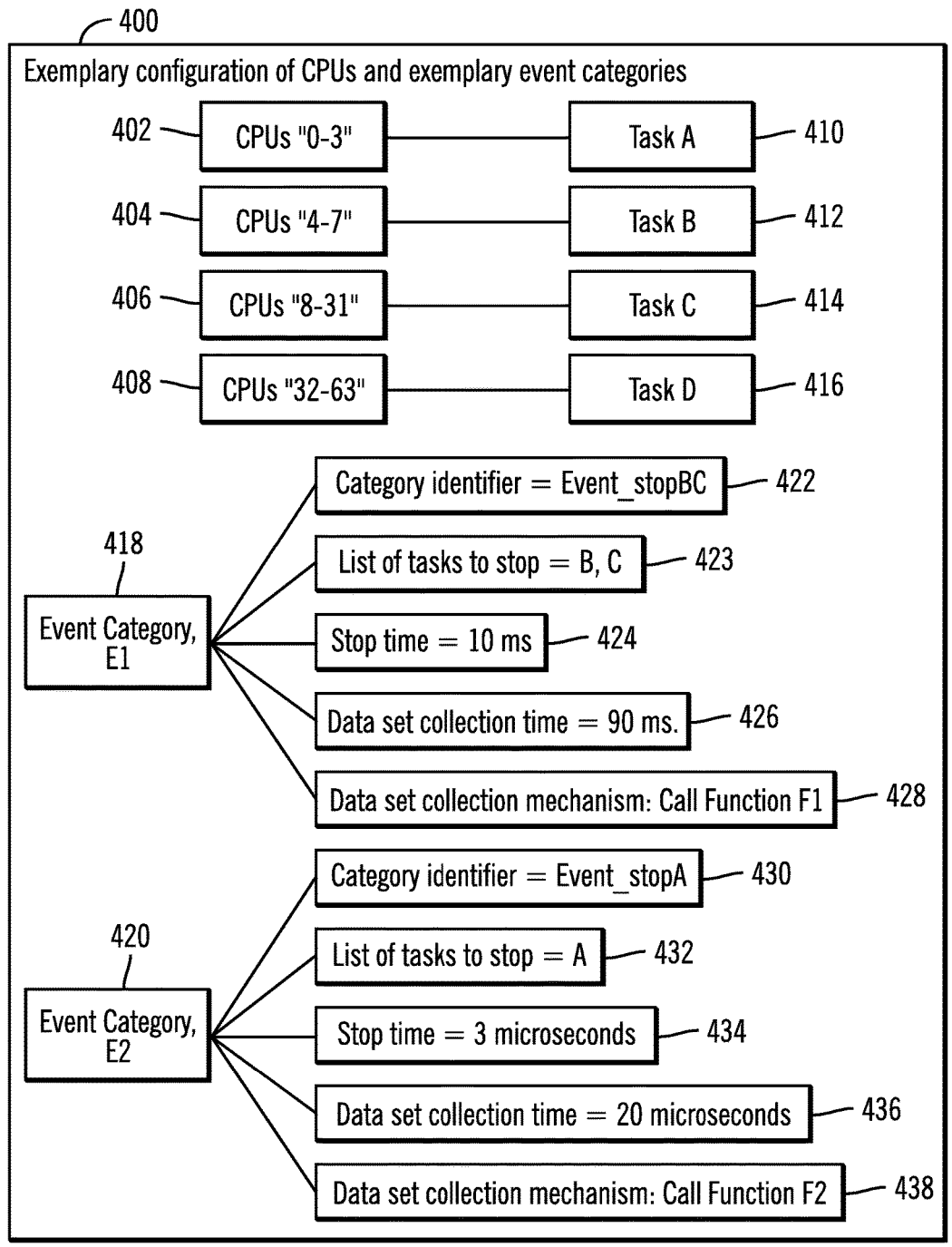
FIG. 4 illustrates a block diagram that shows an exemplary configuration of CPUs and exemplary event categories, in accordance with certain embodiments.

FIG. 4 illustrates a block diagram 400 that shows and exemplary configuration of CPUs and exemplary event categories, in accordance with certain embodiments.

FIG. 4 shows 64 CPUs numbered consecutively from 0 to 63 (shown via reference numeral 402, 404, 406, 408), where task A 410 executes on CPUs "0-3" 402, task B 412 executes on CPUs "4-7" 404, task C 414 executes on CPUs "8-31" 406, and task D 416 executes on CPUs "32-63" 418.

Two event categories that are indicated as event category E1 418 and event category E2 420 are also shown in FIG. 4. Event category E1 418 has the category identifier 422 indicated as "event_stopBC" that corresponds to an event associated with tasks B or C. The list of tasks to stop 423 for event category E1 418 are task B and task C. The stop time 424 for event category E1 418 is 10 milliseconds, and the data set collection time 426 for the event category E1 418 is 90 milliseconds. The data set collection mechanism 428 for event category E1 418 is to call the function F1.

Event category E2 420 has the category identifier 430 indicated as "event_stopA" that corresponds to an event associated with task A. The list of tasks to stop 432 for event category E2 420 includes task A. The stop time 434 for event category E2 420 is 3 microseconds, and the data set collection time 436 for the event category E2 420 is 20 microseconds. The data set collection mechanism 438 for event category E2 420 is to call the function F2.

For embodiments shown in FIG. 4, task A 410 may need to be completed in 70 microseconds to 100 microseconds, so the stop time 434 and data set collection time 436 are set to 3 microseconds and 20 microseconds respectively for event category E2 420 that includes events that need task A 410 to be stopped, in order to allow an adequate amount of time for task A 410 to complete in case the CPUs "0-3" 402 running task A 410 are stopped for data set collection.

Also for embodiments shown in FIG. 4, task B 412 may need to be completed in 180 milliseconds to 200 milliseconds, and task C 414 may need to be completed in 170 milliseconds to 220 milliseconds, so the stop time 424 and data set collection time 426 are set to 10 milliseconds and 90 milliseconds respectively for event category E1 418 that includes events that need task B 412 and task C 414 to be stopped, in order to allow an adequate amount of time for task B 412 and task C 414 to complete in case the CPUs "4-7" 404 running task B 412 and CPUs "8-31" 406 running task C 414 are stopped.

Therefore, the stop time 208 and the data set collection time 210 for an event category 202 are set such that the tasks stopped for the event category 202 can complete in time.

Figure 5:
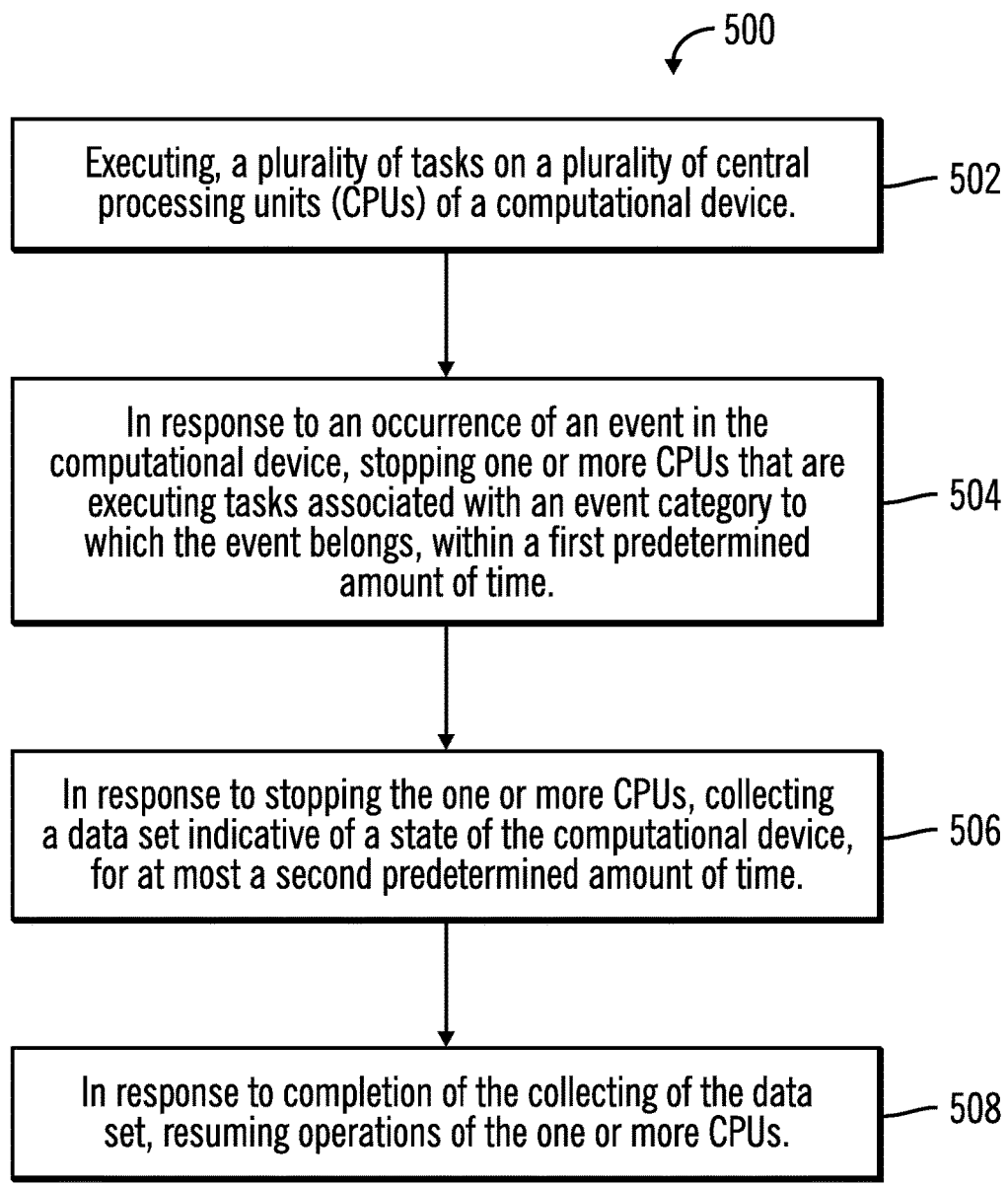
FIG. 5 illustrates a second flowchart that shows how a plurality of CPUs are stopped for collection of a data set, in response to an occurrence of an event, in accordance with certain embodiments.

FIG. 5 illustrates a second flowchart 500 that shows how a plurality of CPUs are stopped for data set collection, in response to an occurrence of an event, in accordance with certain embodiments. The operations shown in FIG. 5 may be performed by the data capture application 132 that executes in the storage controller 102.

Control starts at block 502 in which a plurality of tasks 112, 114, 116, 118 are executed on a plurality of central processing units (CPUs) 104, 106 of a computational device 102. In response to an occurrence of an event 214 in the computational device 102, one or more CPUs that are executing tasks associated with an event category 202 to which the event 214 belongs are stopped (at block 504) within a first predetermined amount of time (e.g. the stop time 208). The one or more CPUs that are stopped may be fewer in number than the plurality of CPUs 104, 106. Additionally, one or more other CPUs of the plurality of CPUs that are not executing tasks associated with an event category continue performing operations while the one or more CPUs are stopped.

From block 504 control proceeds to block 506, in which in response to stopping the one or more CPUs, a data set indicative of a state of the computational device 102 is collected, for at most a second predetermined amount of time (e.g., a data set collection time 210). In response to completion of the collecting of the data set, operations are resumed (at block 508) in the one or more CPUs.

In embodiments shown in FIG. 5, the tasks associated with the event category have to be completed within a third predetermined amount of time, where the first predetermined amount of time and the second predetermined amount of time are set such the tasks associated with the event category are completed within the third predetermined amount of time. The first, second and third predetermined amounts of time may be set by a user or an administrator based on balancing the need for data collection in response to an occurrence of an event, and the need for completing tasks within time limitations. Different data sets may be collected in different amounts of time for different types of tasks with different time requirements.

Figure 6:
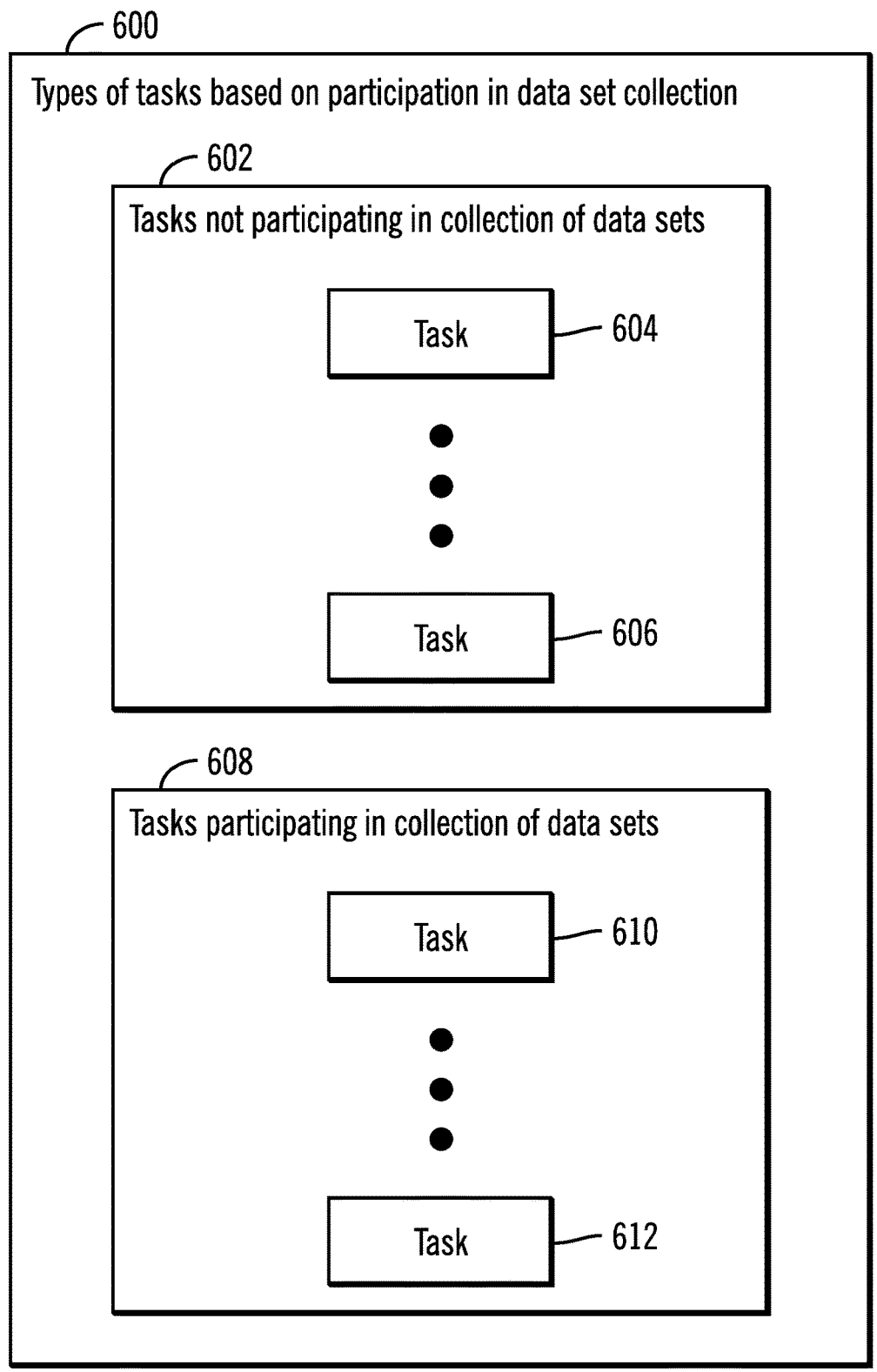
FIG. 6 illustrates a block diagram that shows different types of tasks based on participation in collection of data sets, in accordance with certain embodiments.

FIG. 6 illustrates a block diagram 600 that shows different types of tasks based on participation in data set collection, in accordance with certain embodiments.

Tasks may be grouped into two categories:
(A) Tasks that do not participate in collection of data sets by the data capture application 132 (shown via reference numeral 602, 604, 606); and
(B) Tasks that participate in collection of data sets by the data capture application 132 (shown via reference numeral 608, 610, 612).

The tasks that do not participate in the collection of data sets by the data capture application 132 may require such rapid execution that it is not feasible to collect data sets via the data capture application 132 with the time allotted for the rapid execution. There may be other reasons besides rapid execution, for certain tasks not to participate in the collection of data sets.

In certain embodiments, when a task is created an indication may be made as to whether the task will participate in the data set collection by the data capture application 132 at run time. When an event occurs, CPUs that are running tasks indicated as not participating in the collection of data sets are not stopped.

In certain embodiments, selected tasks of the plurality of tasks 112, 114, 116, 118 shown in FIG. 1 are indicated as not participating in collection of data sets. In such embodiments, if a CPU in the plurality of CPUs 104, 106 is executing any of the selected tasks, then the CPU is not stopped for data collection by the data capture application 132.

Therefore, FIGS. 1-6 illustrate certain embodiments in which a data capture application 132 that executes in the storage controller 102 stops CPUs running specific tasks, and collects specific data sets representing a specific amount of state information within a certain amount of time, based the type of event that triggers the collection of the specific data set. CPUs that execute certain selected tasks that cannot be stopped are exempted from being stopped.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 7:
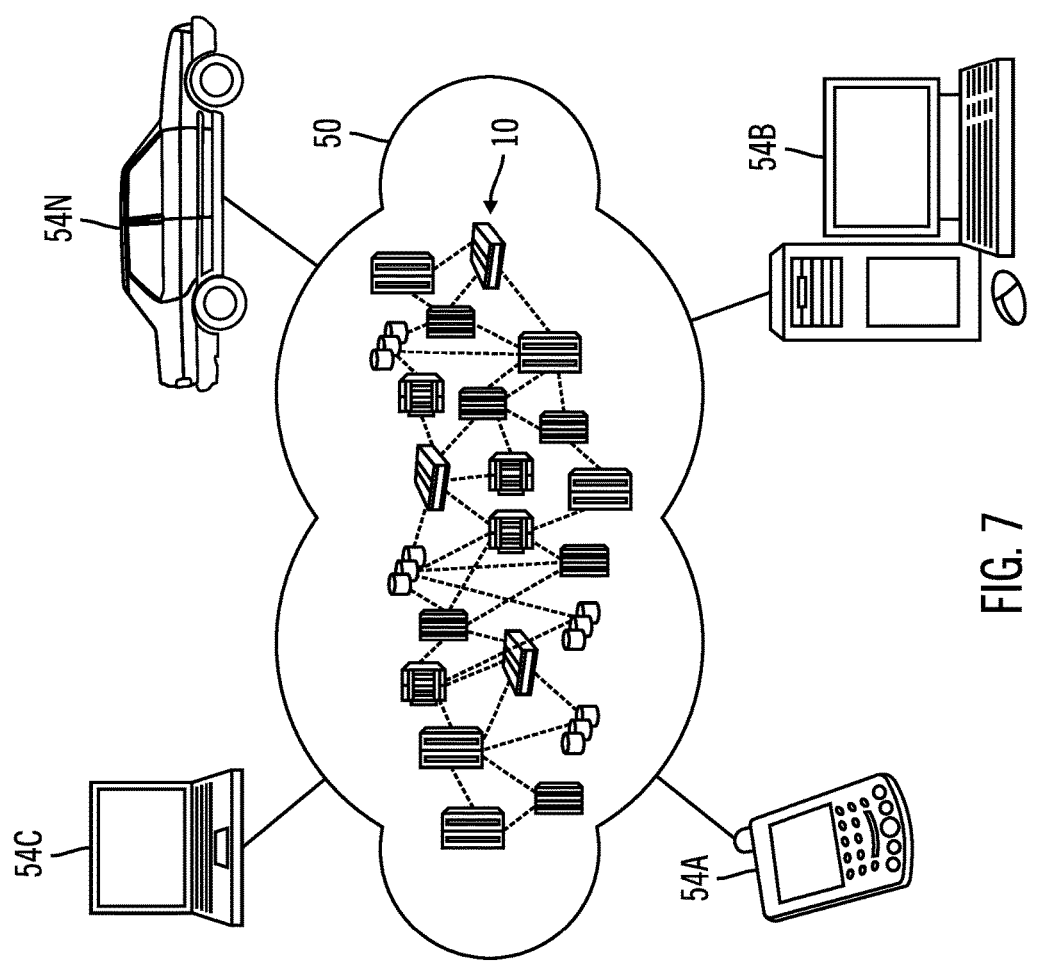
FIG. 7 illustrates a block diagram of a cloud computing environment, in accordance with certain embodiments.

Referring now to FIG. 7, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
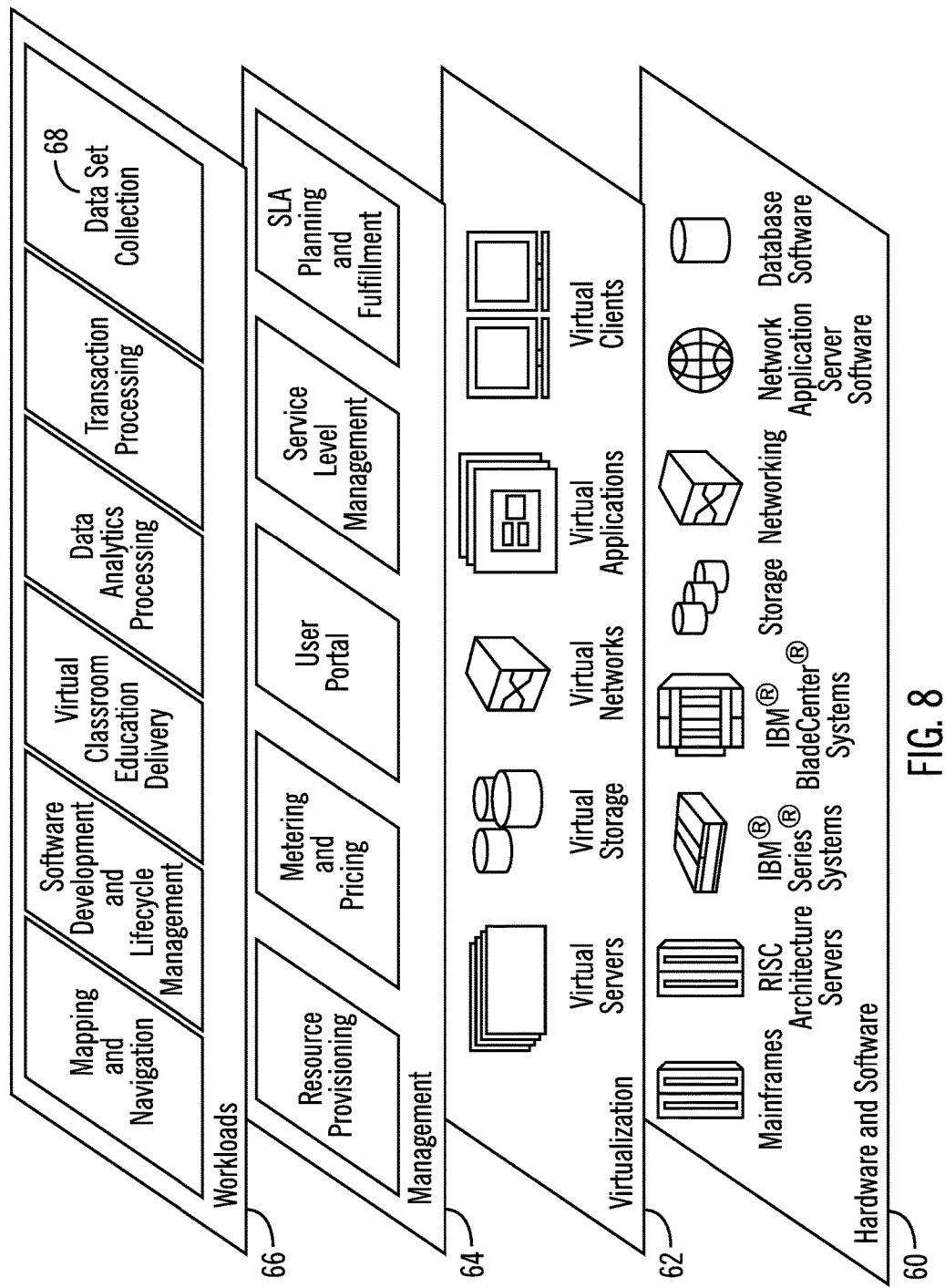
FIG. 8 illustrates a block diagram of further details of the cloud computing environment of FIG. 7, in accordance with certain embodiments.

Referring now to FIG. 8 a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data set collection 68 as shown in FIGS. 1-7.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
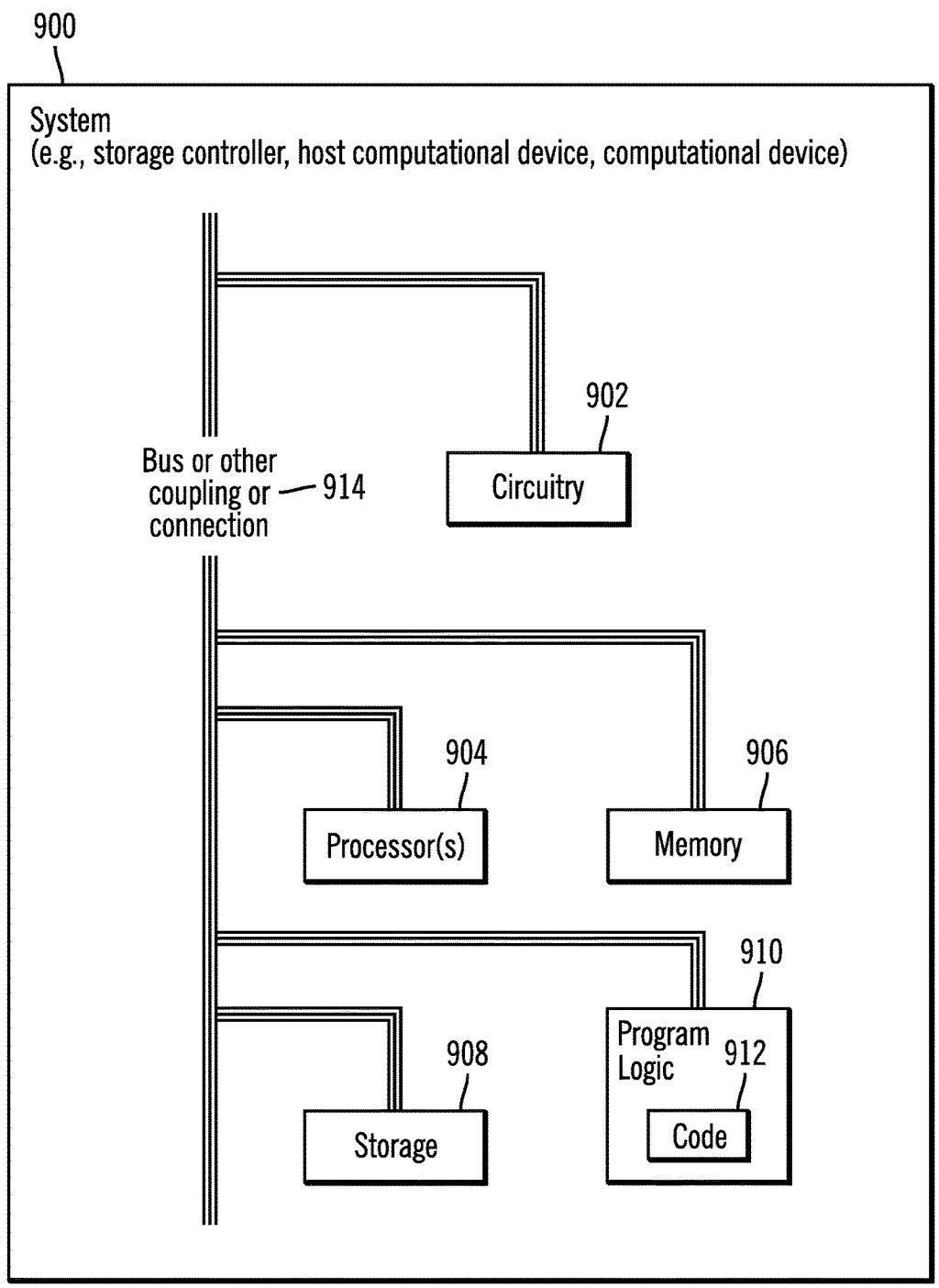
FIG. 9 illustrates a block diagram of a computational system that shows certain elements that may be included in the storage controller, and/or the host computational devices as described in FIGS. 1-8, in accordance with certain embodiments.

FIG. 9 illustrates a block diagram that shows certain elements that may be included in the storage controller 102, and the host computational devices 108, 110 or other computational devices in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. One or more of the components in the system 900 may communicate via a bus or via other coupling or connection 914. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
executing, a plurality of tasks on a plurality of central processing units (CPUs) of a computational device;
in response to an occurrence of an event in the computational device, stopping one or more CPUs that are executing tasks associated with an event category to which the event belongs, within a first predetermined amount of time; and
in response to stopping the one or more CPUs, collecting a data set indicative of a state of the computational device, for at most a second predetermined amount of time, wherein the tasks associated with the event category have to be completed within a third predetermined amount of time, and wherein the first predetermined amount of time and the second predetermined amount of time are set such the tasks associated with the event category are completed within the third predetermined amount of time.

2. A method, comprising:
executing, a plurality of tasks on a plurality of central processing units (CPUs) of a computational device;
in response to an occurrence of an event in the computational device, stopping one or more CPUs that are executing tasks associated with an event category to which the event belongs, within a first predetermined amount of time;
in response to stopping the one or more CPUs, collecting a data set indicative of a state of the computational device, for at most a second predetermined amount of time; and
in response to completion of the collecting of the data set, resuming operations of the one or more CPUs, wherein properties associated with the event category include:
a category identifier for the event category, wherein the category identifier identifies the event category;
a list of tasks, wherein the list of tasks indicates the tasks to stop for the event category, in response to the occurrence on an event belonging to the event category;
a stop time that indicates an amount of time within which CPUs executing tasks in the list of tasks are to be stopped;
a data set collection time that indicates an amount of time within which a data set indicative of a state of the computational device is to be collected after stopping the CPUs executing the tasks in the list of tasks; and
a data set collection mechanism comprising a function that when executed causes the data set to be collected.

3. The method of claim 2, wherein each event of a plurality of events are associated with a category identifier that indicates the event category to which the event belongs.

4. The method of claim 1, wherein the one or more CPUs that are stopped are fewer in number than the plurality of CPUs, wherein one or more other CPUs of the plurality of CPUs that are not executing tasks associated with an event category continue performing operations while the one or more CPUs are stopped, and wherein different data sets are collected for different types of tasks with different time requirements.

5. The method of claim 1, wherein selected tasks of the plurality of tasks are indicated as not participating in collection of data sets at a time of creation of the selected tasks, and wherein if a CPU is executing any of the selected tasks, then the CPU is not stopped.

6. A system, comprising:
a memory; and
a plurality of central processing units (CPUs) coupled to the memory, wherein the system performs operations, the operations comprising:
executing, a plurality of tasks on the plurality of CPUs;
in response to an occurrence of an event in the system, stopping one or more CPUs that are executing tasks associated with an event category to which the event belongs, within a first predetermined amount of time; and
in response to stopping the one or more CPUs in the system, collecting a data set indicative of a state of the system, for at most a second predetermined amount of time, wherein the tasks associated with the event category have to be completed within a third predetermined amount of time, and wherein the first predetermined amount of time and the second predetermined amount of time are set such the tasks associated with the event category are completed within the third predetermined amount of time.

7. A system, comprising:
a memory; and
a plurality of central processing units (CPUs) coupled to the memory, wherein the system performs operations, the operations comprising:
executing, a plurality of tasks on the plurality of CPUs;
in response to an occurrence of an event in the system, stopping one or more CPUs that are executing tasks associated with an event category to which the event belongs, within a first predetermined amount of time;
in response to stopping the one or more CPUs in the system, collecting a data set indicative of a state of the system, for at most a second predetermined amount of time; and
in response to completion of the collecting of the data set, resuming operations of the one or more CPUs, wherein properties associated with the event category include:
a category identifier for the event category, wherein the category identifier identifies the event category;
a list of tasks, wherein the list of tasks indicates the tasks to stop for the event category, in response to the occurrence on an event belonging to the event category;
a stop time that indicates an amount of time within which CPUs executing tasks in the list of tasks are to be stopped;
a data set collection time that indicates an amount of time within which a data set indicative of a state of the system is to be collected after stopping the CPUs executing the tasks in the list of tasks; and
a data set collection mechanism comprising a function that when executed causes the data set to be collected.

8. The system of claim 7, wherein each event of a plurality of events are associated with a category identifier that indicates the event category to which the event belongs.

9. The system of claim 6, wherein the one or more CPUs that are stopped are fewer in number than the plurality of CPUs, wherein one or more other CPUs of the plurality of CPUs that are not executing tasks associated with an event category continue performing operations while the one or more CPUs are stopped, and wherein different data sets are collected for different types of tasks with different time requirements.

10. The system of claim 6, wherein selected tasks of the plurality of tasks are indicated as not participating in collection of data sets at a time of creation of the selected tasks, and wherein if a CPU is executing any of the selected tasks, then the CPU is not stopped.

11. A computer program product, the computer program product comprising a computer-readable storage medium having computer-readable program code embodied therewith, the computer-readable program code configured to perform operations on a computational device, the operations comprising:

execanting, a plurality of tasks on a plurality of central processing units (CPUs) of the computational device;

in response to an occurrence of an event in the computational device, stopping one or more CPUs that are executing tasks associated with an event category to which the event belongs, within a first predetermined amount of time; and in response to stopping the one or more CPUs, collecting a data set indicative of a state of the computational device, for at most a second predetermined amount of time, wherein the tasks associated with the event category have to be completed within a third predetermined amount of time, and wherein the first predetermined amount of time and the second predetermined amount of time are set such the tasks associated with the event category are completed within the third predetermined amount of time.

12. A computer program product, the computer program product comprising a computer-readable storage medium having computer-readable program code embodied therewith, the computer-readable program code configured to perform operations on a computational device, the operations comprising:

executing, a plurality of tasks on a plurality of central processing units (CPUs) of the computational device;

in response to an occurrence of an event in the computational device, stopping one or more CPUs that are executing tasks associated with an event category to which the event belongs, within a first predetermined amount of time;

in response to stopping the one or more CPUs, collecting a data set indicative of a state of the computational device, for at most a second predetermined amount of time; and in response to completion of the collecting of the data set, resuming operations of the one or more CPUs, wherein properties associated with the event category include:

a category identifier for the event category, wherein the category identifier identifies the event category;

a list of tasks, wherein the list of tasks indicates the tasks to stop for the event category, in response to the occurrence on an event belonging to the event category;

a stop time that indicates an amount of time within which CPUs executing tasks in the list of tasks are to be stopped;

a data set collection time that indicates an amount of time within which a data set indicative of a state of the computational device is to be collected after stopping the CPUs executing the tasks in the list of tasks; and a data set collection mechanism comprising a function that when executed causes the data set to be collected.

13. The computer program product of claim 12, wherein each event of a plurality of events are associated with a category identifier that indicates the event category to which the event belongs.

14. The computer program product of claim 11, wherein the one or more CPUs that are stopped are fewer in number than the plurality of CPUs, wherein one or more other CPUs of the plurality of CPUs that are not executing tasks associated with an event category continue performing operations while the one or more CPUs are stopped, and wherein different data sets are collected for different types of tasks with different time requirements.

15. The computer program product of claim 11, wherein selected tasks of the plurality of tasks are indicated as not participating in collection of data sets at a time of creation of the selected tasks, and wherein if a CPU is executing any of the selected tasks, then the CPU is not stopped.

* * * * *